US006582239B2

(12) United States Patent
Ozawa (10) Patent No.: US 6,582,239 B2
(45) Date of Patent: Jun. 24, 2003

(54) ELECTRICAL CONNECTING BOX FOR VEHICLE

(75) Inventor: Keisuke Ozawa, Kosai (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 10/120,452

(22) Filed: Apr. 12, 2002

(65) Prior Publication Data

US 2002/0160634 A1 Oct. 31, 2002

(30) Foreign Application Priority Data

Apr. 12, 2001 (JP) .................................... 2001-114307

(51) Int. Cl.[7] .............................................. H01R 12/00
(52) U.S. Cl. ..................................... 439/76.2; 439/949
(58) Field of Search ............................. 439/76.2, 949, 439/709

(56) References Cited

U.S. PATENT DOCUMENTS

| 4,850,884 | A | * | 7/1989 | Sawai et al. ............... 439/76.2 |
| 5,980,302 | A | * | 11/1999 | Saka ......................... 439/76.2 |

FOREIGN PATENT DOCUMENTS

| JP | 2-219413 | 9/1990 |
| JP | 4-51480 | 2/1992 |
| JP | 2001-45631 | 2/2001 |
| JP | 2001-45632 | 2/2001 |

* cited by examiner

*Primary Examiner*—P. Austin Bradley
*Assistant Examiner*—Briggitte R. Hammond
(74) *Attorney, Agent, or Firm*—Oblon, Spivak, McClelland, Maier & Neustadt, P.C.

(57) ABSTRACT

An electrical connecting box includes a common unit with a built-in standard circuit common to plural kinds of vehicles and an exclusive unit with a built-in exclusive circuit peculiar to one of the plural kinds of vehicles. The exclusive unit includes a plurality of module plates each having a plurality of wire connecting pieces, a unit housing for retaining a stack of the module plates and a plurality of connecting bars penetrating the stack of module plates to connect the wire connecting pieces on the module plates with each other, establishing a desired circuit as a whole. The exclusive circuit corresponding to a desired kind of vehicle can be provided by selecting the arrangements of the wire connecting pieces and the connecting bars appropriately.

8 Claims, 10 Drawing Sheets

ELECTRICAL CONNECTING BOX FOR VEHICLE

BACKGROUND OF THE INVENTION

1. Field of the Invention

The present invention generally relates to an electrical connecting box for vehicle. More particularly, the invention relates to an electrical connecting box which is applicable to various kinds of vehicles requiring the structure of circuits different from each other.

2. Description of the Related Art

Figure 1A:
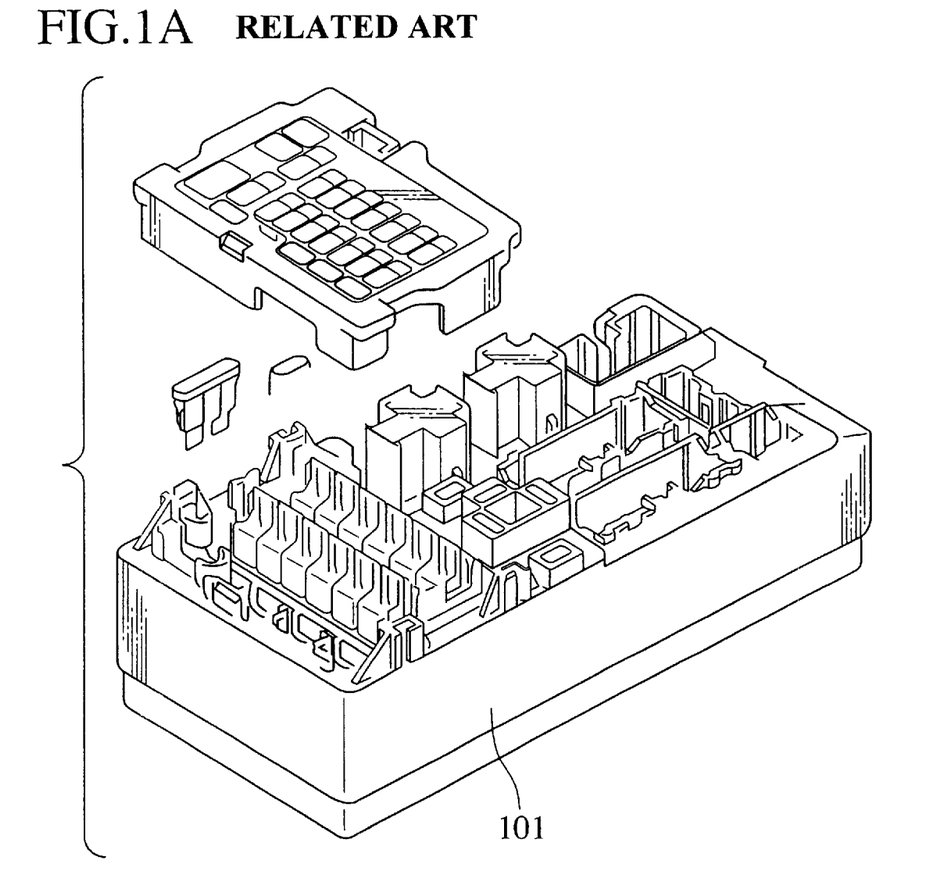
FIG. 1A is a perspective view of a proposed electrical connecting box and FIG. 1B is an enlarged partial view of FIG. 1A.
Figure 1B:
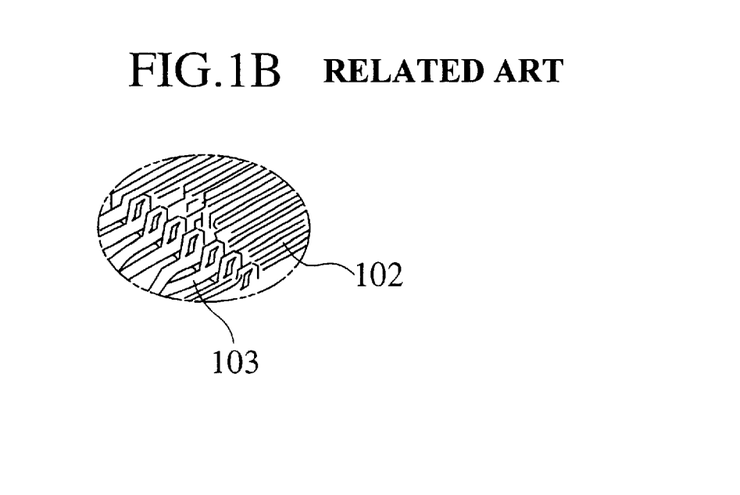
Figure 2:
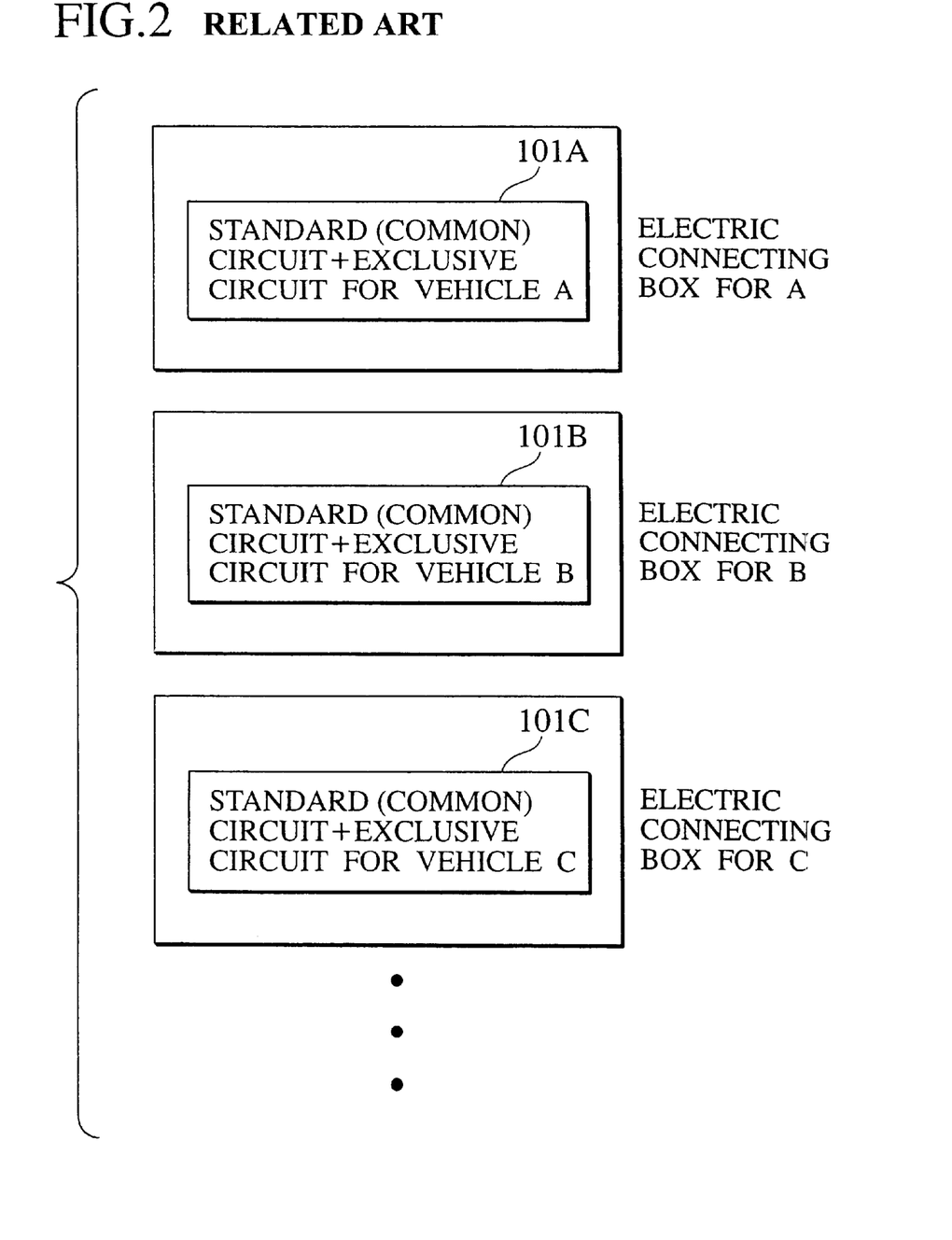
FIG. 2 is a block diagram showing various combination patterns of circuits in the electrical connecting boxes.

FIGS. 1A and 1B show a proposed electrical connecting box. The electrical connecting box has a box body 101 in which internal circuits are built by bus bars 102, wires 103 and so on. In this view, when applying the electrical connecting box to various types of vehicles having different internal circuits respectively, it has been carried out to design and manufacture a new electrical connecting box for each of vehicles of different kinds, as shown in FIG. 2.

For example, in case of an electrical connecting box for vehicle A, a box body 101A includes a standard (common) circuit and an exclusive circuit for vehicle A integrated with each other, including bus bars and wires.

Similarly, in case of an electrical connecting box for vehicle B, a box body 101B includes the standard circuit and an exclusive circuit for vehicle B integrated with each other. Again, in case of an electrical connecting box for vehicle C, a box body 101C includes the standard circuit and an exclusive circuit for vehicle C integrated with each other.

In this way, since the electrical connecting boxes have to be designed and manufactured for every vehicle of different kinds conventionally, the manufacturing cost for electrical connecting box is apt to increase due to high design fee, molding die of high cost, etc. Further, since a modification in the specification of the electrical connecting box has been met by exchanging the bus bars or changing the wiring route of wires, it is possible to modify the specification with ease. Above all, against great modification in the specification, there may occur an impossibility of coping with such a great modification.

SUMMARY OF THE INVENTION

Under the circumstances, it is therefore an object of the present invention to provide an electrical connecting box which is applicable to various kinds of vehicles pliably while avoiding the increasing in its manufacturing cost.

The object of the present invention described above can be accomplished by an electrical connecting box for vehicle, comprising: a common unit with a built-in standard circuit common to plural kinds of vehicles; and an exclusive unit with a built-in exclusive circuit peculiar to a specified kind of vehicle, the exclusive unit including: a plurality of module plates each having a plate body, a plurality of wire accommodating grooves defined by a plurality of partition walls formed on the plate body and a plurality of wire connecting pieces arranged in the wire accommodating grooves on selection in accordance with a predetermined lay-out of a circuit to be established in the module plates, the wire connecting pieces being respectively connected with wires at respective ends thereof or respective intermediate parts of the wires; a plural kind of unit housings formed peculiarly to the specified kind of vehicle respectively, for retaining a stack of module plates; and a plurality of inter-layer wiring members penetrating among respective layers forming the stack of module plates thereby to connect the wire connecting pieces in the module plates with each other, establishing a desired circuit as a whole; wherein the exclusive unit is integrated with the common unit thereby to complete the electrical connecting box peculiar to the specified kind of vehicle.

According to the electrical connecting box of the invention, by altering the positions of the wire connecting pieces on the plate body and the positions of the inter-layer wiring members penetrating a stack of module plates appropriately, it is possible to establish exclusive circuits which are different from each other every kinds of vehicles, whereby a plural kinds of exclusive units having such exclusive circuits can be provided. Accordingly, by further combining the exclusive units with the common units for integration, it is possible to provide the electrical connecting boxes of numerous kinds corresponding to a variety of vehicles. In this case, the change of circuits corresponding to the determined kind of vehicle can be easily met by selecting the arrangements of the wire connecting pieces and the inter-layer wiring members on the common module plates appropriately. Thus, the electrical connecting box of the invention can meet a modification corresponding to the determined kind of vehicle with flexibility and without increasing the manufacturing cost. In conclusion, due to high applicability and high degree of freedom in the structure of circuit, the electrical connecting box of the invention can meet the modification in design with ease.

In the second aspect of the present invention, the common unit of the above electrical connecting box has a housing body and an exclusive-unit mounting part formed besides the housing body to mount the exclusive unit thereon.

In the third aspect of the present invention, each of the inter-layer wiring members is shaped in form of a connecting bar.

In the fourth aspect of the present invention, each of the wire connecting pieces has a bar-connecting part shaped so as to be a rectangular cylinder into which the connecting bar is to be inserted.

In the fifth aspect of the present invention, each of the module plates has a plurality of through holes formed to receive the bar-connecting parts of the wire connecting pieces therein.

In the sixth aspect of the present invention, the inter-layer wiring members penetrate the module plates thereby to project from the bottom of the stack of the module plates partially.

In the seventh aspect of the present invention, the exclusive-unit mounting part is provided, on an upper face thereof, with insertion parts for receiving the inter-layer wiring members projecting from the bottom of the exclusive unit.

In the eighth aspect of the present invention, there is also provided an electrical connecting system comprising, in combination: a plurality of common units each having a built-in standard circuit common to plural kinds of vehicles; and a plurality of exclusive units having built-in exclusive circuits different from each other corresponding to the plural kinds of vehicles, the exclusive units including: a plurality of module plates each having a plate body, a plurality of wire accommodating grooves defined by a plurality of partition walls formed on the plate body and a plurality of wire connecting pieces arranged in the wire accommodating grooves on selection in accordance with a predetermined lay-out of a circuit to be established in the module plates, the wire connecting pieces being respectively connected with wires at respective ends thereof or respective intermediate parts of the wires; a plurality of unit housings formed peculiarly to the plural kinds of vehicles respectively, for retaining a stack of module plates; and a plurality of inter-layer wiring members penetrating among respective layers forming the stack of module plates thereby to connect the wire connecting pieces in the module plates with each other, establishing a desired circuit as a whole; wherein one or more specified exclusive units are selected from the exclusive units and integrated with the common units thereby to complete the electrical connecting boxes peculiar to the specified kinds of vehicles.

These and other objects and features of the present invention will become more fully apparent from the following description and appended claims taken in conjunction with the accompany drawings.

DESCRIPTION OF THE PREFERRED EMBODIMENT

An embodiment of the present invention will be described with reference to the drawings.

Figure 3:
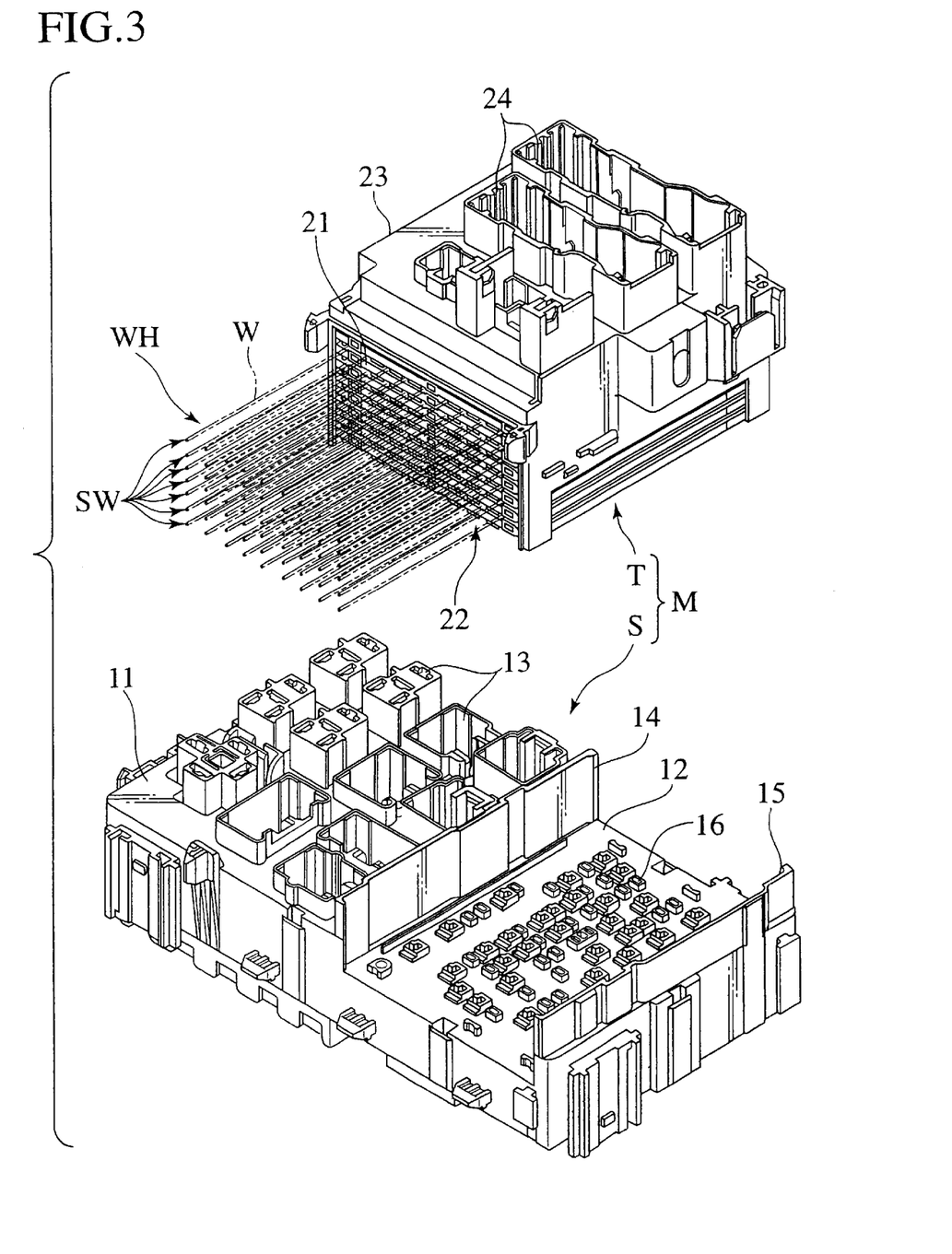
FIG. 3 is a perspective view of an electrical connecting box before its assembled state, in accordance with an embodiment of the present invention.
Figure 4:
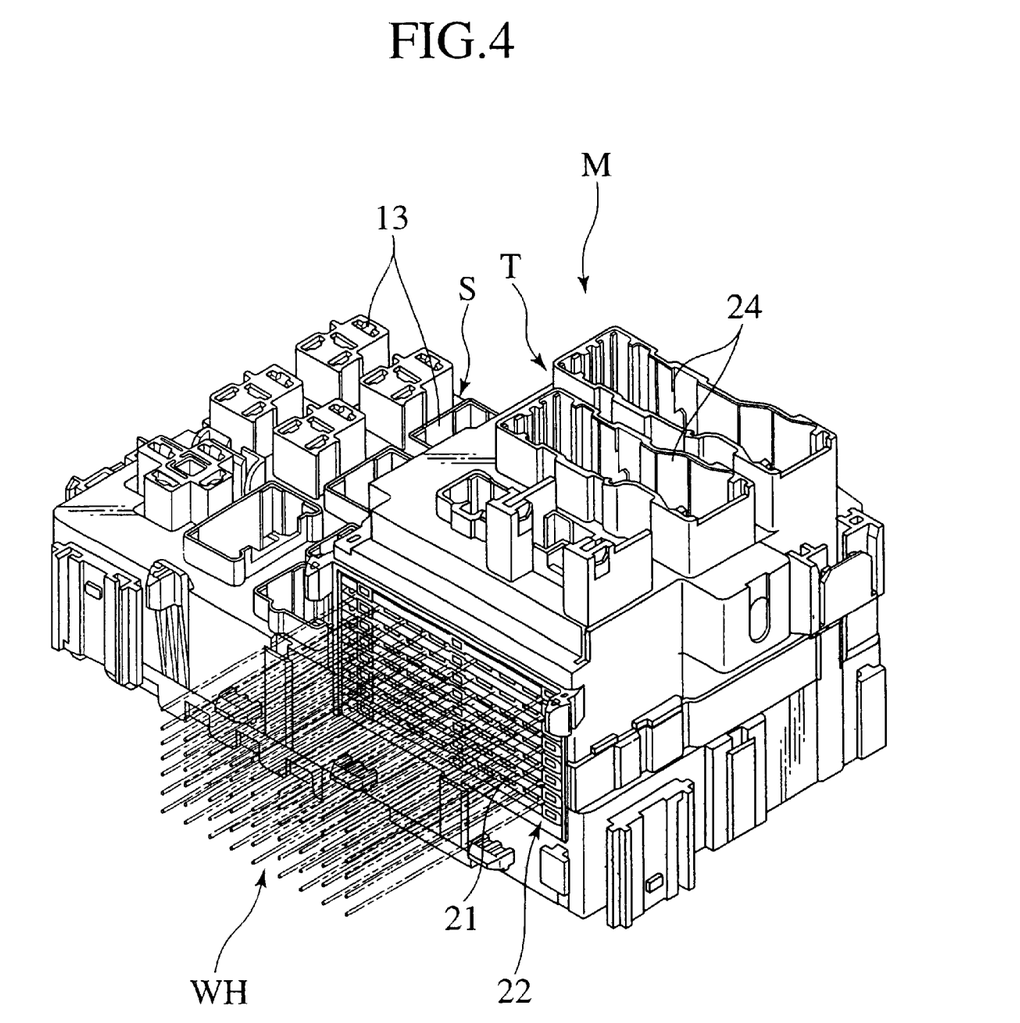
FIG. 4 is a perspective view of the electrical connecting box after its assembled state, in accordance with the embodiment of the present invention.

FIGS. 3 to 8 show an embodiment of an electrical connecting box of the present invention. As shown in FIGS. 3 and 4, this electrical connecting box M 1 comprises a common unit S having a built-in standard circuit common to plural kinds of vehicles and an exclusive unit T having a built-in circuit exclusive to the vehicle concerned, both of the units S, T being assembled into one body.

Figure 5:
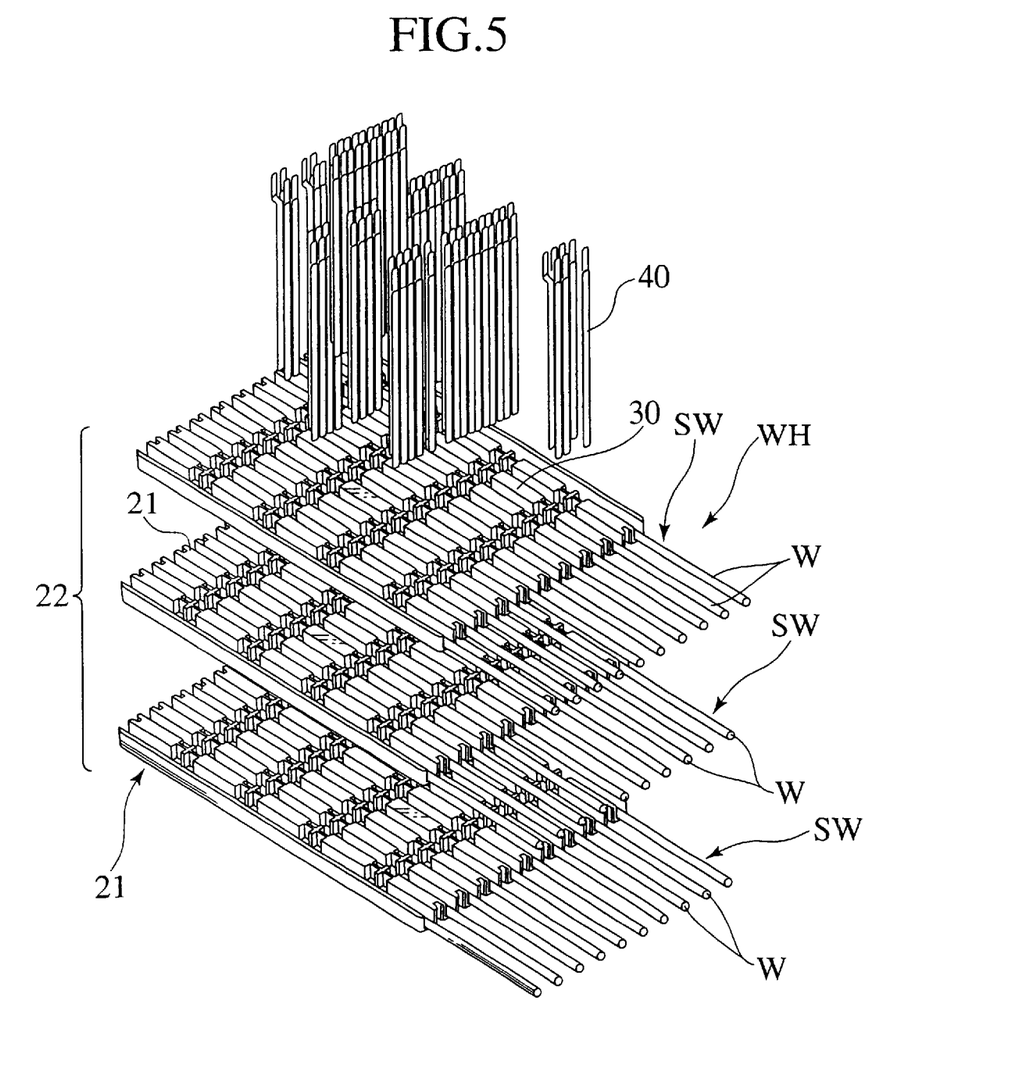
FIG. 5 is a perspective view showing the relationship between module plates and connecting bars (inter-layer wiring members) both installed in kinds of units, in accordance with the embodiment of the present invention.
Figure 6:
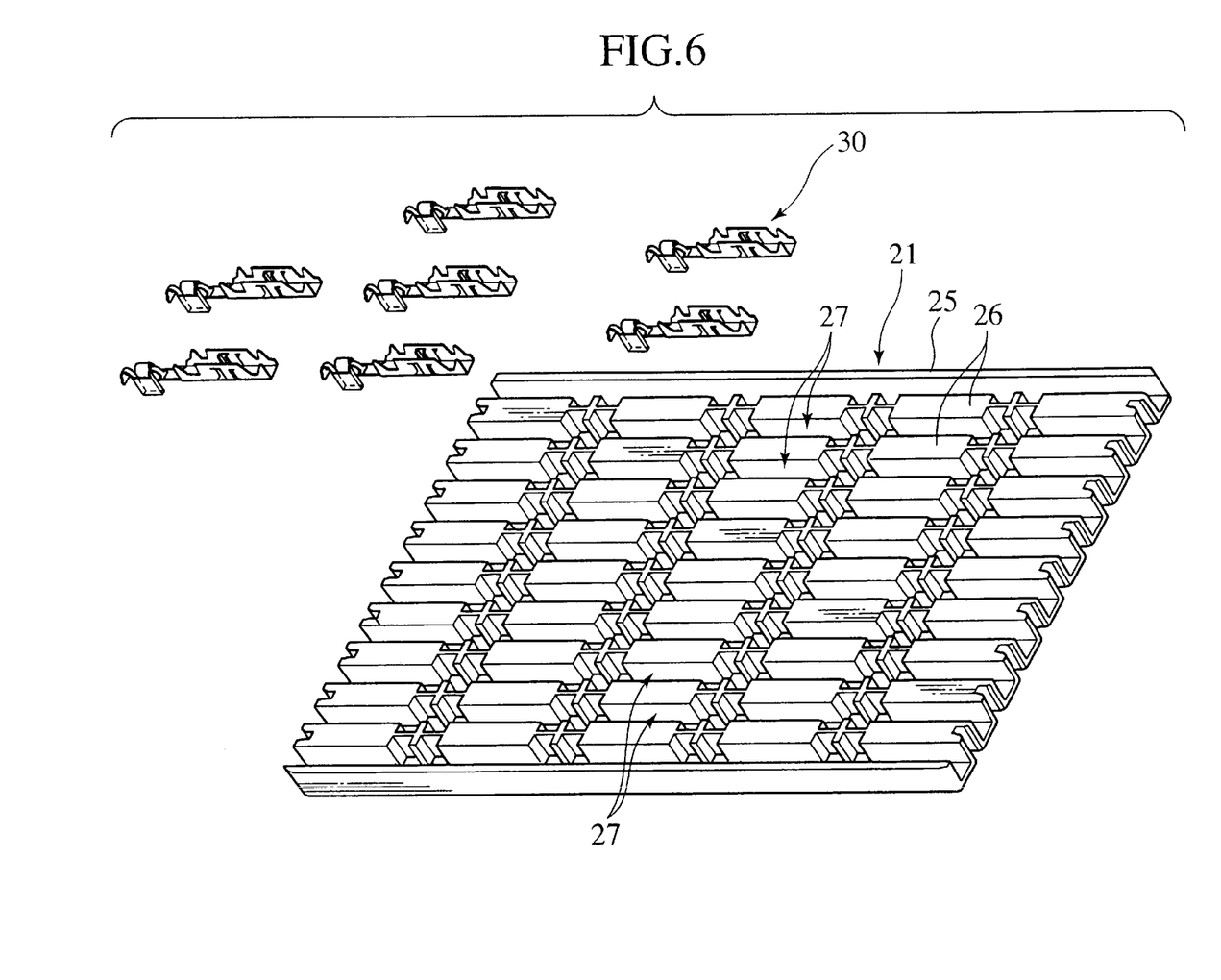
FIG. 6 is a perspective view showing the relationship between the module plate and wire connecting metal fittings (in-layer wiring members)

As shown in FIGS. 5 and 6, the exclusive unit T includes a plurality of module plates 21 each having a plurality of wire connecting pieces (metal fittings) 30 and also laid to overlap each other, a unit housing 23 carrying a stack 22 of the module plates 21 and a plurality of connecting bars 40 penetrating respective layers of the stack 22 thereby to selectively connect the wire connecting metals 30 on the respective module plates 21 with each other. In this way, owing to the selective arrangement of the wire connecting piece 30 and the connecting bars 40, it becomes possible to establish an exclusive circuit in accordance with the sort of vehicle concerned. Note, the above wire connecting piece 30 forms the in-layer wiring member of the invention, while the above connecting bar 40 forms the inter-layer wiring member of the invention.

A wire harness WH to be connected with the exclusive unit T comprises a cluster of sub-wire harnesses SW. Each of the sub-wire harnesses SW is formed by a cluster of covered wires W. The module plates 21 are prepared every sub-wire harnesses SW. In each of the sub-wire harnesses SW, the constituent wires W have their ends connected to the module plate 21.

As shown in FIG. 3, the common unit S has a housing body 11 and an exclusive-unit mounting part 12 formed on the lateral side of the body 11. The housing body 11 is provided, on an upper face thereof, with a variety of cavities 13, for example, relay cavity, fuse cavity, female-connector cavity, fusible-link cavity, etc. The exclusive-unit mounting part 12 is formed so as to mount and secure the exclusive unit T thereon between sidewalls 14, 15 of predetermined heights. Further, the exclusive-unit mounting part 12 is provided, on an upper face thereof, with insertion parts 16 for receiving connecting bars 40 projecting from the bottom of the exclusive unit T. With the insertion of the lower ends of the connecting bars 40 into the insertion parts 16, it becomes possible to connect the internal circuits of the common circuit S with those of the exclusive circuit T electrically.

Figure 7:
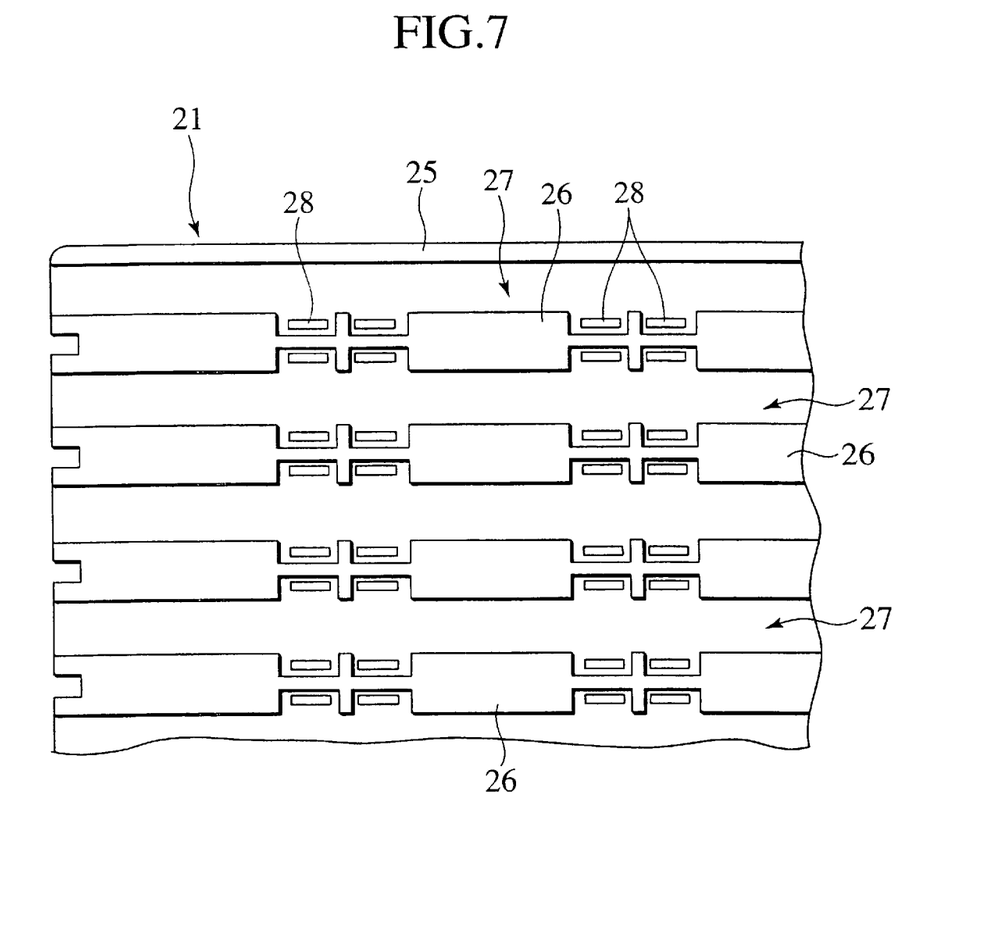
FIG. 7 is a partial plan view of the module plates.

As shown in FIGS. 6 and 7, the module plate 21 includes a rectangular plate body 25 with an area to be accommodated in the top of the exclusive-unit mounting part 12, wire accommodating grooves 27 defined on the top of the plate body 12 and partitioned by a plurality of partitions 26, one or more wire connecting pieces (the in-layer wiring members) 30 arranged in the wire accommodating grooves 27 and also connected with respective terminals of the wires or their intermediate parts. The wire connecting pieces 30 are arranged on the respective module plates 21 in accordance with a designated layout for circuit to be built up. Then, corresponding to the positions of the wire connecting pieces 30 and also the inserting positions of the connecting bars 40, it is possible to form an optional circuit appropriately and also possible to meet the modifications of circuit with ease.

Figure 8:
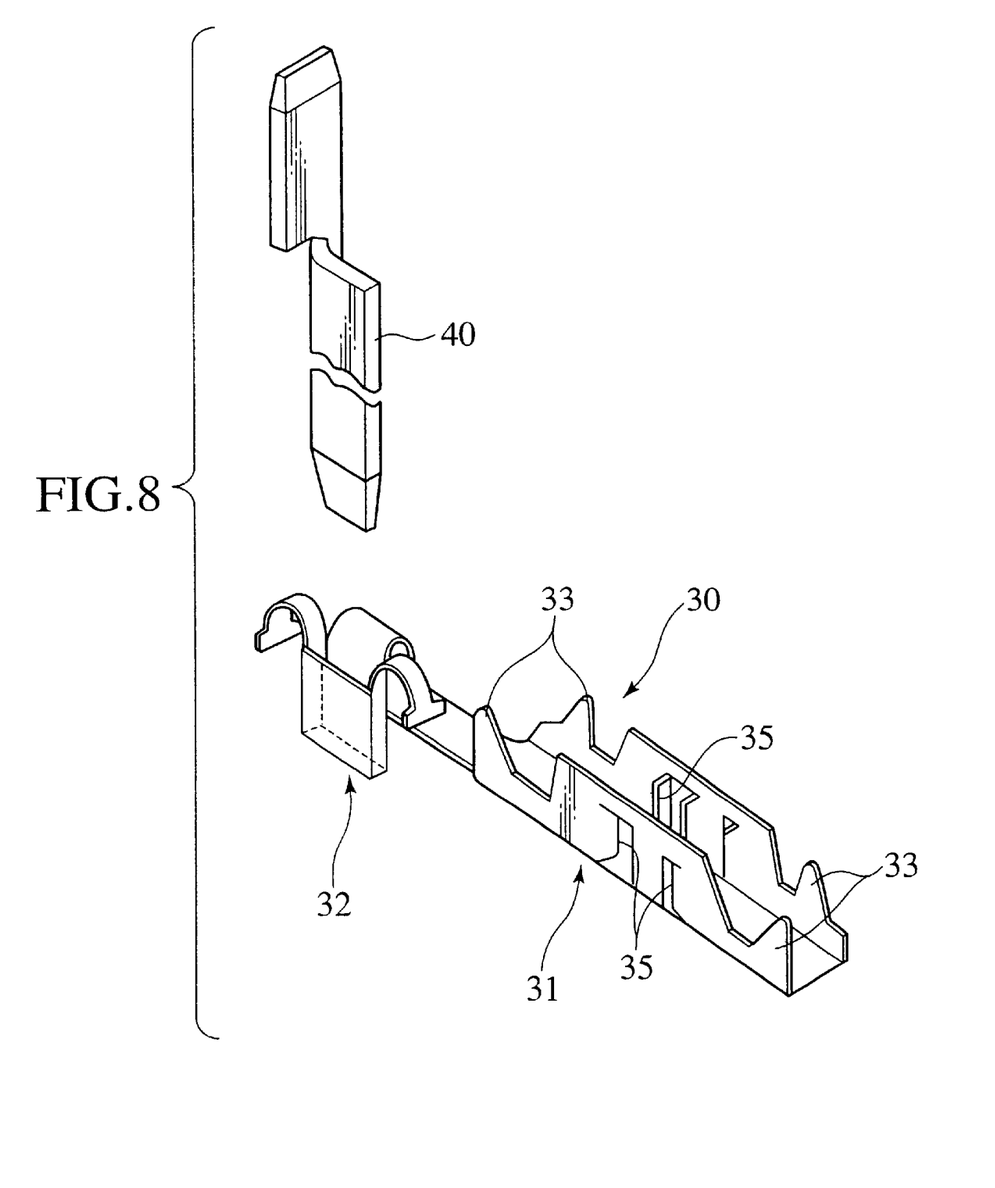
FIG. 8 is a perspective view showing the relationship between the connecting metal fittings (in-layer wiring members) metal fittings and the connecting bars (inter-layer wiring members) both fitted to the module plate.

As shown in FIG. 8, the wire connecting piece 30 has a wire holding part 31 to be disposed in the wire accommodating groove 27 between the partitions 26, 26 in the width direction of the module plate 21, and a rectangular-and-cylindrical bar contact part 32 positioned somewhat beside the end of the wire holding part 31. The wire holding part 31 includes opposing folding pieces 33 for holding a wire therebetween and also press-fitting edges 35 for electrical connection with the wire. The bar contact part 32 in the form of a rectangular cylinder is arranged so that its rectangular-and-cylindrical hole communicates with one of through-holes 28 (see FIG. 7) formed in the module plate 21, allowing the connecting bar 40 to be inserted into the rectangular-and-cylindrical hole of the part 32. Note, each of the wire connecting pieces 30 is retained in the wire connecting groove 27 of the module plate 21.

In assembling, the so-formed wire connecting pieces 30 are arranged in appropriate positions on the module plates 21 and subsequently, they are laid to overlap with each other in order. Then, the connecting bars 40 are inserted into the stack 22 composed of the module plates 21 thereby to establish a designated circuit.

As shown in FIG. 3, the unit housing 23 is provided, on a top face thereof, with hood parts 24 which form connectors respectively. In the hood parts 24, the respective ends of the connecting bars 40 stand upright to form connector pins (connector terminals).

We now describe the method of assembling the electrical connecting box M.

In order to assemble the electrical connecting box M of this embodiment, first arrange the wire connecting pieces 30 in the wire accommodating grooves 27 at designated positions on the module plate 21 and further fix the pieces 30 to the module plate 21. Then, the wire connecting pieces 30 are positioned on the module plate 21 in a manner that the through holes in the plate 21 communicate with the cylindrical holes of the bar connecting parts 32 of the wire connecting pieces 30.

Next, prepare a plurality of module plates 21 constructed in the above way and subsequently, connect the wire connecting pieces 30 on the respective module plates 21 with the wires W respectively. For this connection, the wire W are press-fitted between the opposing press-fitting edges 35. Consequently, due to the press-fitting operation, the insulating cover of the wire is cut by the press-fitting edges 35, effecting the electrical connection between the wire W and the wire connecting piece 30.

After press-fitting the wire W between the press-fitting edges 35, the folding pieces 33 are folded so as to encircle the wire W to fix it on the wire connecting piece 30. In this way, a group of wires W connected to the respective module plates 21 does constitute the above-mentioned sub-wire harness SW.

After completing the assembling of the module plates 21, it is carried out to pile the module plates 21 in prescribed order and further dispose the resultant stack 22 composed of the module plates 21 in the unit housing 23. Then, the connecting bars 40 are inserted into the designated through holes of the uppermost module plate 21, completing the exclusive unit T having a built-in circuit exclusive to the desired vehicle. By putting the unit housing 23 on the stack 22, the respective tops of the connecting bars 40 stand upright in the respective hood parts 24 on the top of the unit housing 23, functioning as the connector pins (connector terminals). In this way, there is completed a connector which is connectable with a load system for vehicle appropriately.

Thereafter, as shown in FIG. 4, the exclusive unit T is mounted on the exclusive-unit mounting part 12 of the common unit S and fixed thereon. Then, by inserting the lower ends of the connecting bars 40 into the insertion parts 16 of the exclusive-unit mounting part 12, the internal circuits of the exclusive unit T are connected with the internal circuits of the common unit S, completing the electrical connecting box M.

According to the electrical connecting box M of the embodiment, since the internal circuit may be easily modified by altering the wiring pattern of the wires W on the module plates 21 and positioning the wire connecting pieces 30 and the connecting bars 40 properly without quite changing the basic constitution of the module plates 21, it is possible to allow the electrical connecting box M to meet different requirements about the sort of vehicle and the standard, with ease.

Note, in the modification the electrical connecting box M may be produced in accordance with another assembling method comprising the following steps of: first mounting the stack 22 composed of the module plates 21 on the exclusive-unit mounting part 12 of the common unit S; second inserting the connecting bars 40 into the stack 22; and finally putting the unit housing 23 in the form of a cover on the stack 22.

Figure 9:
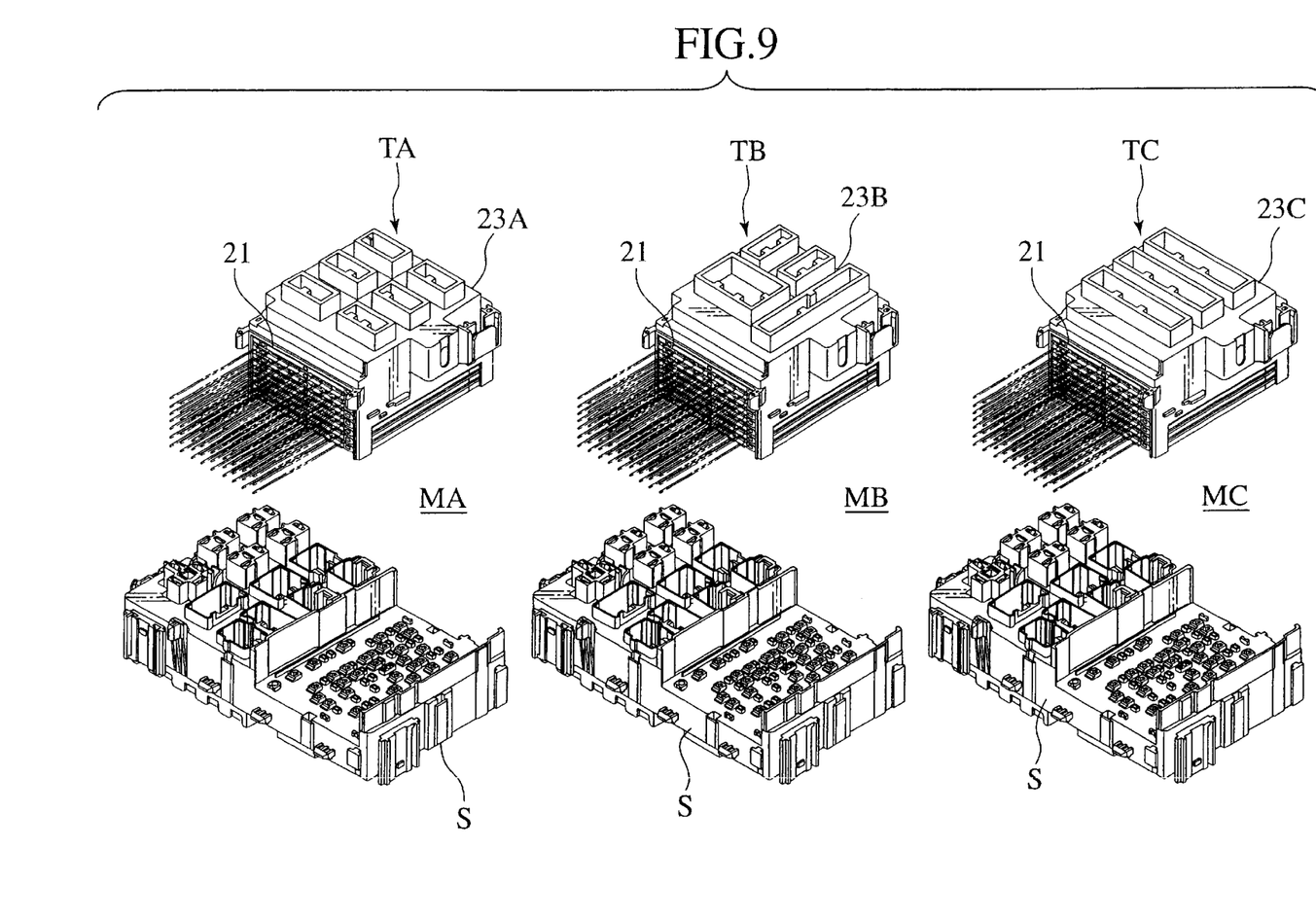
FIG. 9 is a perspective view showing a variety of combination patterns in the electrical connecting box of the present invention.

FIG. 9 show a series of electrical connecting boxes MA, MB and MC where respective exclusive units TA, TB and TC are assembled to the common units S, respectively.

Each of the shown common units S has a built-in exclusive circuit common to plural kinds of vehicles. On the other hand, the exclusive units TA, TB and TC have respective built-in exclusive circuits peculiar to vehicles A, B and C, which are obtained by altering the wiring pattern on the module plates 21 and the arrangements of the wire connecting pieces 30, the connecting bars 40 (see FIGS. 3 to 8), etc. appropriately. In assembling, by combining the exclusive units TA to TC with the common units S into respective one bodies, it is possible to construct the electrical connecting box MA peculiar to the vehicle A, the electrical connecting box MB peculiar to the vehicle B and the electrical connecting box MC peculiar to the vehicle C.

In the so-completed electrical connecting boxes MA, MB and MC, the constituent exclusive units TA, TB and TC have respective unit housings 23A, 23B and 23C whose structures are different from each other. Nevertheless, the constituent module plates 21 are common to the units TA, TB and TC and therefore, it is possible to restrict the increasing in the number of the sorts of components, contributing the reduction in manufacturing cost.

Figure 10:
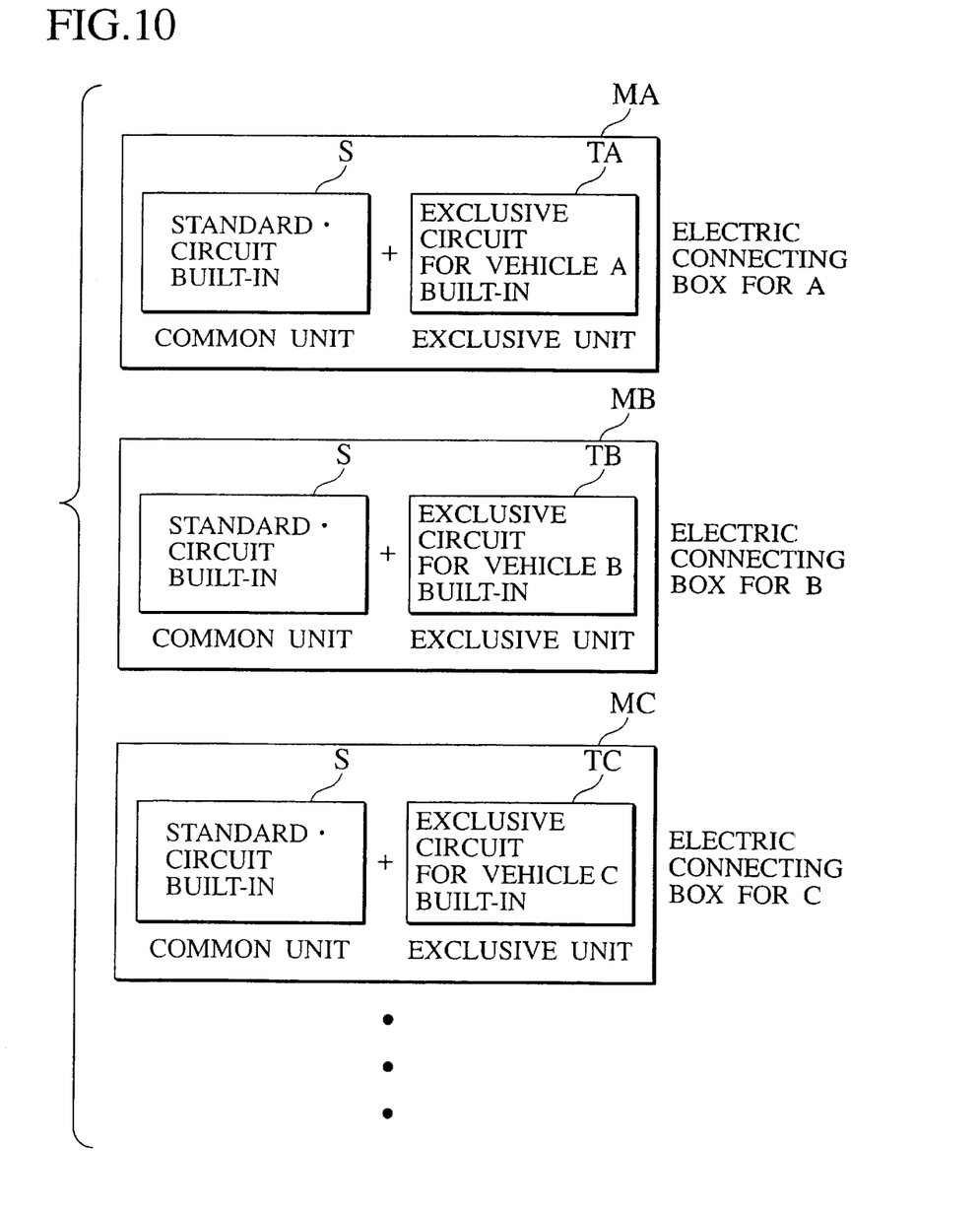
FIG. 10 is a block diagram showing a variety of combination patterns in the electrical connecting box of the present invention.

FIG. 10 is a block diagram showing the structures of the electrical connecting boxes MA, MB and MC. As shown in this figure, the common units S have built-in standard circuits, while the exclusive units TA, TB and TC have respective exclusive circuits peculiar to the vehicles A, B and C, respectively. Repeatedly, the electrical connecting boxes MA, MB and MC peculiar to the vehicles A, B and C are respectively provided by combining the common units S with the exclusive units TA, TB and TC.

As mentioned above, according to the electrical connecting box of the invention, by altering the positions of the wire connecting pieces on the plate body and the positions of the inter-layer wiring members penetrating a stack of module plates appropriately, it is possible to establish exclusive circuits which are different from each other every kinds of vehicles, whereby a plural kinds of exclusive units having such exclusive circuits can be provided.

Accordingly, by further combining the exclusive units with the common units for integration, it is possible to provide the electrical connecting boxes of numerous kinds corresponding to a variety of vehicles. In this case, the change of circuits corresponding to the determined kind of vehicle can be easily met by selecting the arrangements of the wire connecting pieces and the inter-layer wiring members on the common module plates appropriately. Thus, the electrical connecting box of the invention can meet a modification corresponding to the determined kind of vehicle with flexibility and without increasing the manufacturing cost. That is, due to high applicability and high degree of freedom in the structure of circuit, the electrical connecting box of the invention can meet the modification in design with ease.

Finally, it will be understood by those skilled in the art that the foregoing description is one preferred embodiment of the disclosed electrical connecting box for vehicle. Various changes and modifications may be made to the present invention without departing from the spirit and scope of the invention.

What is claimed is:

1. An electrical connecting box for a vehicle, comprising:

a common unit with a built-in standard circuit common to plural kinds of vehicles; and an exclusive unit with a built-in exclusive circuit peculiar to a specified kind of vehicle, the exclusive unit including:

a plurality of module plates each having a plate body, a plurality of wire accommodating grooves defined by a plurality of partition walls formed on the plate body and a plurality of wire connecting pieces arranged in the wire accommodating grooves on selection in accordance with a predetermined lay-out of a circuit to be established in the module plates, the wire connecting pieces being respectively connected with wires at respective ends thereof or respective intermediate parts of the wires;

a plurality of kinds of unit housings formed peculiarly to the specified kind of vehicle respectively, for retaining a stack of module plates; and a plurality of inter-layer wiring members penetrating among respective layers forming the stack of module plates thereby to connect the wire connecting pieces in the module plates with each other, establishing a desired circuit as a whole;

wherein the exclusive unit is integrated with the common unit thereby to complete the electrical connecting box peculiar to the specified kind of vehicle.

2. The electrical connecting box as claimed in claim 1, wherein the common unit has a housing body and an exclusive-unit mounting part formed besides the housing body to mount the exclusive unit thereon.

3. The electrical connecting box as claimed in claim 2, wherein each of the inter-layer wiring members is shaped in form of a connecting bar.

4. The electrical connecting box as claimed in claim 3, wherein each of the wire connecting pieces has a bar-connecting part shaped so as to be a rectangular cylinder into which the connecting bar is to be inserted.

5. The electrical connecting box as claimed in claim 4, wherein each of the module plates has a plurality of through holes formed to receive the bar-connecting parts of the wire connecting pieces therein.

6. The electrical connecting box as claimed in claim 5, wherein the inter-layer wiring members penetrate the module plates thereby to project from the bottom of the stack of the module plates partially.

7. The electrical connecting box as claimed in claim 6, wherein the exclusive-unit mounting part is provided, on an upper face thereof, with insertion parts for receiving the inter-layer wiring members projecting from the bottom of the exclusive unit.

8. An electrical connecting system comprising:

a plurality of common units each having a built-in standard circuit common to plural kinds of vehicles; and a plurality of exclusive units having built-in exclusive circuits different from each other corresponding to the plural kinds of vehicles, the exclusive units including:

a plurality of module plates each having a plate body, a plurality of wire accommodating grooves defined by a plurality of partition walls formed on the plate body and a plurality of wire connecting pieces arranged in the wire accommodating grooves on selection in accordance with a predetermined lay-out of a circuit to be established in the module plates, the wire connecting pieces being respectively connected with wires at respective ends thereof or respective intermediate parts of the wires;

a plurality of kinds of unit housings formed peculiarly to the plural kinds of vehicles respectively, for retaining a stack of module plates; and a plurality of inter-layer wiring members penetrating among respective layers forming the stack of module plates thereby to connect the wire connecting pieces in the module plates with each other, establishing a desired circuit as a whole, wherein one or more specified exclusive units are selected from the exclusive units and integrated with the common units thereby to complete the electrical connecting boxes peculiar to the specified kinds of vehicles.

* * * * *